United States Patent
Butuc et al.

(10) Patent No.: US 8,944,789 B2
(45) Date of Patent: Feb. 3, 2015

(54) ENHANCED ELASTOMERIC STATOR INSERT VIA REINFORCING AGENT DISTRIBUTION AND ORIENTATION

(75) Inventors: Stefan Butuc, The Woodlands, TX (US); Jiinjen A. Sue, The Woodlands, TX (US); Harold A. Sreshta, Conroe, TX (US); Joshua A. Sicilian, Houston, TX (US)

(73) Assignee: National Oilwell Varco, L.P., Houston, TX (US)

( * ) Notice: Subject to any disclaimer, the term of this patent is extended or adjusted under 35 U.S.C. 154(b) by 487 days.

(21) Appl. No.: 13/214,866

(22) Filed: Aug. 22, 2011

(65) Prior Publication Data

US 2012/0148432 A1 Jun. 14, 2012

Related U.S. Application Data

(60) Provisional application No. 61/421,897, filed on Dec. 10, 2010.

(51) Int. Cl.
| | |
|---|---|
| *F01C 1/10* | (2006.01) |
| *F03C 2/00* | (2006.01) |
| *F03C 4/00* | (2006.01) |
| *F04C 2/00* | (2006.01) |
| *F04C 2/107* | (2006.01) |
| *C08J 3/20* | (2006.01) |
| *B29C 70/62* | (2006.01) |
| *B29C 70/02* | (2006.01) |

(52) U.S. Cl.
CPC ............ *F04C 2/1075* (2013.01); *C08J 3/203* (2013.01); *B29C 70/62* (2013.01); *B29C 70/025* (2013.01); *F05C 2253/04* (2013.01); *F05C 2253/22* (2013.01); *C08J 2321/00* (2013.01); *B29K 2995/0008* (2013.01)
USPC .................. 418/48; 418/1; 418/152; 418/153

(58) Field of Classification Search
USPC .................... 418/48, 152, 153, 1; 29/888.023
See application file for complete search history.

(56) References Cited

U.S. PATENT DOCUMENTS

| 3,141,050 A | 7/1964 | Blume, Jr. |
| 3,312,763 A | 4/1967 | Peccerill et al. |

(Continued)

FOREIGN PATENT DOCUMENTS

WO 2008107712 A1 9/2008

OTHER PUBLICATIONS

WO 2008/107712 A1—Webb, Spinner Apparatus, Sep. 12, 2008—English Translation.*

(Continued)

*Primary Examiner* — Theresa Trieu
(74) *Attorney, Agent, or Firm* — Conley Rose, P.C.

(57) ABSTRACT

A progressive cavity type motor or pump including a stator insert with a reinforcing agent dispersed in a manner to improve properties of the stator insert. The reinforcing agent may be a fiber, nanotube, metal, ceramic, or polymer. A dispersing agent may be used to obtain a homogenous distribution. A magnetic reinforcing agent may be incorporated into a stator insert. The stator insert is subjected to a magnetic field to orient the magnetic reinforcing agent in a particular orientation. The magnetic field may also reposition the magnetic reinforcing agent within the stator insert. The stator insert may be formed by injection molding, transfer, or compression molding among other methods.

26 Claims, 12 Drawing Sheets

(56) References Cited

U.S. PATENT DOCUMENTS

| | | | |
|---|---|---|---|
| 3,368,992 A | 2/1968 | Hans | |
| 3,949,141 A | 4/1976 | Marzocchi et al. | |
| 4,356,280 A | 10/1982 | Wells et al. | |
| 4,425,287 A * | 1/1984 | Hesse et al. | 428/913 |
| 4,443,573 A | 4/1984 | Wells et al. | |
| 4,547,546 A | 10/1985 | Wells et al. | |
| 4,686,252 A | 8/1987 | Burge et al. | |
| 5,363,929 A | 11/1994 | Williams et al. | |
| 5,466,526 A | 11/1995 | Magata | |
| 5,722,820 A | 3/1998 | Wild et al. | |
| 5,759,019 A | 6/1998 | Wood et al. | |
| 6,102,681 A | 8/2000 | Turner | |
| 6,183,226 B1 | 2/2001 | Wood et al. | |
| 6,309,195 B1 | 10/2001 | Bottos et al. | |
| 6,428,890 B1 * | 8/2002 | Ting | 428/361 |
| 6,544,015 B1 | 4/2003 | Kaechele | |
| 6,568,076 B2 | 5/2003 | Bottos et al. | |
| 6,604,922 B1 | 8/2003 | Hache | |
| 6,666,668 B1 | 12/2003 | Kaechele | |
| 6,689,835 B2 * | 2/2004 | Amarasekera et al. | 524/495 |
| 6,726,990 B1 | 4/2004 | Kumar et al. | |
| 6,872,061 B2 | 3/2005 | Lemay et al. | |
| 6,944,935 B2 | 9/2005 | Hache | |
| 7,014,803 B2 | 3/2006 | Perez et al. | |
| 7,074,499 B2 | 7/2006 | Schnurer et al. | |
| 7,083,401 B2 | 8/2006 | Hooper | |
| 7,094,285 B2 | 8/2006 | Mazany et al. | |
| 7,122,594 B2 * | 10/2006 | Kubo et al. | 524/451 |
| 7,316,548 B2 | 1/2008 | Jager | |
| 7,396,220 B2 | 7/2008 | Delpassand | |
| 7,407,372 B2 | 8/2008 | Guidry et al. | |
| 7,442,019 B2 | 10/2008 | Kaiser et al. | |
| 7,517,202 B2 | 4/2009 | Delpassand | |
| 7,691,305 B2 | 4/2010 | Sutton et al. | |
| 7,723,421 B2 | 5/2010 | Guzauskas | |
| 2002/0064655 A1 | 5/2002 | Morin et al. | |
| 2002/0084029 A1 | 7/2002 | Turner et al. | |
| 2004/0147029 A1 | 7/2004 | Adam | |
| 2005/0089429 A1 | 4/2005 | Delpassand et al. | |
| 2005/0245664 A1 | 11/2005 | Podszun et al. | |
| 2008/0145647 A1 | 6/2008 | Ganguli et al. | |
| 2008/0304991 A1 | 12/2008 | Speckert | |
| 2008/0304992 A1 | 12/2008 | Hooper et al. | |
| 2009/0152009 A1 | 6/2009 | Slay et al. | |
| 2010/0003530 A1 | 1/2010 | Ganguli et al. | |
| 2010/0038142 A1 | 2/2010 | Snyder et al. | |
| 2010/0098569 A1 | 4/2010 | Robisson et al. | |

OTHER PUBLICATIONS

PCT/US2011/048796 International Search Report and Written Opinion Dated Feb. 11, 2013 (14 p.).

C. Ruddy, E. Ahearne and G. Byrne; A Review of Magnetorheological Elastomers: Properties and Applications; Advanced Manufacturing Science (AMS) Research Centre, Mechanical Engineering, University College Dublin, Belfield, Dublin 4, Ireland, http://www/ucd.ie/mecheng/ams/news_items/Cillian%20Ruddy.pdf on Nov. 14, 2013.

* cited by examiner

ENHANCED ELASTOMERIC STATOR INSERT VIA REINFORCING AGENT DISTRIBUTION AND ORIENTATION

CROSS-REFERENCE TO RELATED APPLICATIONS

This application claims the benefit under 35 U.S.C. §119(e) of U.S. Provisional Application No. 61/421,897 filed on Dec. 10, 2010, the disclosure of which is hereby incorporated herein by reference.

BACKGROUND

1. Field of the Invention

The invention generally relates to pumps and motors that have a rotor disposed within a stator to give relative rotational movement. More particularly, the invention relates to a reinforced stator insert with a magnetic reinforcing agent that is incorporated into a stator insert.

2. Background of the Technology

Progressive cavity type pumps (PC pumps) and motors generally include a stator having a helical internal bore, having lobes, in which a helical rotor, also having lobes, is positioned and can rotate in. The outer surface of the rotor and the inner surface of the stator are both helical and together create hollow chambers between their contact points in which fluid can travel. During rotation of the rotor, these hollow chambers advance from one end of the stator towards the other end during the rotation of the rotor. Each of these hollow chambers is isolated and sealed from the other chambers. In conventional progressive cavity style pumps and motors, the rotor lobes and stator lobes are disposed in an interference fit, wherein the rotor has one fewer lobe than the stator. Progressive cavity type pumps can be referred to as a PC pump, a progressive cavity pump, a progressing cavity pump, an eccentric screw pump, or a cavity pump.

These PC pumps can be used as a pump to transfer fluids or used as a motor utilizing the fluid passing through the chambers as a power source. The progressive cavity type motors are sometimes referred to as a positive displacement motor (PD motor), a progressive cavity motor, a progressing cavity motor, an eccentric screw motor, or a cavity motor. Because a PD motor design has few components, it can be made with a small diameter while being able to generate considerable torque. In some applications, this design is applied to subsurface boring motors (i.e. mud motors) for the drilling of wellbores. The medium that is pumped or used as the drive fluid may contain a certain amount of particles without the risk of damaging the pump or motor, which is an advantage of utilizing eccentric screw motors in drilling wellbores. Drilling mud that is used to cool and lubricate the drill bit and to bring cuttings to the surface up the annulus area between the drill string and the wellbore may be used as the drive fluid for a cavity motor to provide rotational movement to the bit via hydraulic pressure of the drilling mud. This enables the drilling of directional wellbores, which may be used in performance drilling to increase the power at the drill bit, in operations in which the rotation of the drill string is impractical, and in other applications.

Conventional stators typically include a helical cavity component bonded to an inner surface of tubing (e.g., a steel tube) or housing. The helical cavity component in such conventional stators typically includes an elastomeric component called an elastomeric stator insert that lines the steel tube or housing. This elastomeric stator insert provides a surface having at least some resilience with which to facilitate the interference fit with the rotor. It is the elastomeric stator insert that forms the helical cavity component and contacts the rotor.

Conventionally, stator manufacturers use an injection molding process to form elastomeric stator inserts. The injection molding process requires low viscosity materials that can result in limitations on the stiffness and resilience of the final material. Furthermore, the elastomeric stator insert typically must form a seal with the rotor. During operation, the rotor and stator insert are in constant frictional contact at a plurality of locations. Materials with low stiffness, strength, or resilience may wear quickly, reducing efficiency, power, and life span of the elastomeric stator insert. Substances may be incorporated within an elastomer to alter its mechanical properties. For example, carbon nanotubes (CNT) have been added to an elastomeric stator insert in order to increase the modulus and the stiffness of the stator insert.

Powersection and progressive cavity pumps require an injectible uncured elastomer to fill the long stator tube during injection moulding. Traditionally, once the tube and mould tooling is filled, it is cured in an oven or autoclave. Traditionally, various fibers have not been mixed into polymer(s) due to the fibers' high affinity to bundle to one another thus creating a nonhomogeneously filled elastomer. In some instances, materials, such as the aforementioned carbon nanotubes, have been added to polymer(s) through the use of a modification process known in the art as surface functionalization. Although surface functionalization may provide an effective process for the dispersion of carbon nanotubes in the polymer(s), the modification process typically adds significant economic costs to the manufacture of the stator insert. Such costs may make the use of carbon nanotubes economically unfeasible.

In view of the above, it would be desirable to increase the efficiency, power, and life span of the PC pump or PD motor as well as the strength, hysteretic/dynamic properties, tear resistance and resilience of its components. It would also be desirable to incorporate substances within an elastomeric stator insert of a cavity pump or motor to effectively enhance strength, hysteretic/dynamic properties, tear resistance, resilience, and wear properties throughout the elastomeric stator insert. Additionally, it would be desirable to selectively orient and/or position substances throughout an elastomeric stator insert to achieve a desired property. Furthermore, it would also be desirable to have a rotor and stator insert that would also be cost-effective, yet resilient enough to withstand operating conditions and rigid enough to perform under operating conditions for a longer period of time than currently available.

BRIEF SUMMARY OF THE DISCLOSED EMBODIMENTS

These and other needs in the art are addressed by an embodiment of the stator insert which comprises an elastomeric component. In addition, the stator insert comprise a reinforcing agent. Further, the stator insert comprises a dispersing substance. The dispersing substance is a carrier for the reinforcing agent within the elastomeric component. The reinforcing agent and dispersing substance are substantially homogenously distributed throughout the elastomeric component. In a further embodiment of the stator insert, the reinforcing agent is one or more organic fibers. In a further still embodiment, the reinforcing agent is one or more inorganic fibers. In another embodiment, the reinforcing agent is one or more carbon nanotubes. In one embodiment, the dispersing substance is selected from the group consisting of clay, glass, fumed silica, silicon dioxide, diamond, and combinations thereof. In a further embodiment, the dispersing substance is silicon dioxide.

In another embodiment, the stator insert further comprises a plurality of magnetic particles. The magnetic particles are disposed within the elastomeric component. In another embodiment the stator insert substantially lies along an axis and the plurality of magnetic particles are substantially oriented perpendicular to the axis.

In one embodiment, the method of making a stator insert comprises incorporating a reinforcing agent and a dispersing substance into a polymer to form a substantially homogenous mixture. In addition, the method comprises forming a stator insert from the mixture. In a further embodiment the polymer contains at least one of the following: carbon black, clay, or silica. In some other embodiments, the dispersing substance is selected from the group consisting of clay, glass, fumed silica, diamond, silicon dioxide and combinations thereof. In other embodiments, the dispersing substance is silicon dioxide and is some further embodiments, the silicon dioxide is micron-size and substantially spherical. In some embodiments, the polymer is selected from the group consisting of nitrile (NBR), hydrogenated nitrile (HNBR), EPDM, Chloroprene (neoprene) and fluoroelastomers (FKM), and combinations thereof. In other embodiments, the reinforcing agent is one or more organic fibers, in further embodiments, the reinforcing agent is one or more inorganic fibers and in some other embodiments, the reinforcing agent is one or more carbon nanotubes.

In some embodiments, the method herein described further comprises, incorporating a plurality of magnetic particles into the substantially homogenous mixture; and applying a magnetic field to the stator insert to orient the plurality of magnetic particles. In another embodiment, a method of making a stator insert comprises incorporating a plurality of magnetic particles into a polymer, resulting in a mixture. In addition, the method comprises forming a stator insert from the mixture. Further, the method comprises applying a magnetic field to the stator insert to orient the plurality of magnetic particles. In a further embodiment the plurality of magnetic particles have high aspect ratios.

In one embodiment of the method herein described, the stator insert substantially lies along an axis and applying the magnetic field to the stator insert orients the plurality of high aspect ratio magnetic particles to be substantially perpendicular to the axis. In another embodiment of the method, the polymer is selected from the group consisting of nitrile (NBR), hydrogenated nitrile (HNBR), EPDM, Chloroprene (neoprene) and fluoroelastomers (FKM), and combinations thereof. In a further embodiment, the stator insert comprises diamond particles and in a further still embodiment, the stator insert comprises KEVLAR® fibers. In other embodiments, the method further comprising: incorporating a reinforcing agent and a dispersing substance into the mixture.

In one embodiment herein described, a stator insert comprises an elastomeric component. In addition, the stator insert comprises a plurality of magnetic particles. The magnetic particles are disposed within the elastomeric component, and in a further embodiment the stator insert substantially lies along an axis and the plurality of magnetic particles are substantially oriented perpendicular to the axis.

In another embodiment the method of making a stator insert includes incorporating a reinforcing agent and a dispersing substance into a polymer to form a substantially homogenous mixture. In addition, the method comprises mixing the mixture until the temperature of the mixture is at least 100° C. Further, the method comprises cooling the mixture for a specified time; and forming a stator component from the mixture. In an embodiment, the polymer contains among other substances at least one of the following: carbon black, clay, or silica. In an embodiment, the polymer is selected from the group consisting of nitrile (NBR), hydrogenated nitrile (HNBR), EPDM, Chloroprene (neoprene) and fluoroelastomers (FKM), and combinations thereof. The reinforcing agent may be one or more nanotubes, organic fibers or inorganic fibers. In some embodiments, the dispersing substance is silicon dioxide. In some cases, the silicon dioxide is micron-size and spherical. In some embodiments, the silicon dioxide has an average particle size of from 25 to 300 nm, alternatively from 50 to 250 nm, or alternatively from 100 to 200 nm. In an embodiment, the dispersing substance has a specific surface area of from 5 to 50 $m^2/g$, alternatively from 10 to 40 $m^2/g$, or alternatively from 15 to 25 $m^2/g$.

In some embodiments, the stator insert is formed by an injection molding process. In other embodiments, the stator insert is formed by a transfer molding process. In yet other embodiments, the stator insert is formed by a compression molding process.

Another embodiment is a method of making a stator insert that includes incorporating a plurality of magnetic particles into a first polymer to obtain a mixture, forming a stator insert from the mixture, and applying a magnetic field to the stator insert to orient the plurality of magnetic particles. In some embodiments, a majority of the plurality of magnetic particles have high aspect ratios. In some of these embodiments, the stator insert substantially lies along an axis and application of the magnetic field orients the plurality of high aspect ratio magnetic particles to be substantially perpendicular to the axis. Furthermore in some embodiments, application of the magnetic field moves the plurality of magnetic particles within the stator insert. In various embodiments, the plurality of magnetic particles comprises metal particles, ceramic particles, a second polymer, or combinations thereof. In an embodiment, the first polymer is selected from the group consisting of nitrile (NBR), hydrogenated nitrile (HNBR), EPDM, Chloroprene (neoprene) and fluoroelastomers (FKM), and combinations thereof.

In some embodiments, the stator insert incorporates diamond particles. In other embodiments, the stator insert incorporates high aspect ratio fibers, such as KEVLAR® fibers. In alternate embodiments, the stator insert incorporates fibrillated pulp material. In alternate embodiments, the stator insert incorporates treated fibers, such as partially or fully treated fibers. In alternate embodiments, the stator insert incorporates nanocarbons such as graphene and nanotubes, such as carbon nanotubes (CNT), including single wall CNTs, multi-wall CNTs, and arrays of CNTs. In some embodiments, the stator insert is formed by an injection molding process. In other embodiments, the stator insert is formed by a transfer molding process. In yet other embodiments, the stator insert is formed by a compression molding process.

BRIEF DESCRIPTION OF DRAWINGS

For a detailed description of the disclosed embodiments of the invention, reference will now be made to the accompanying drawings, wherein.

DETAILED DESCRIPTION OF THE DISCLOSED EMBODIMENTS

Figure 1A:
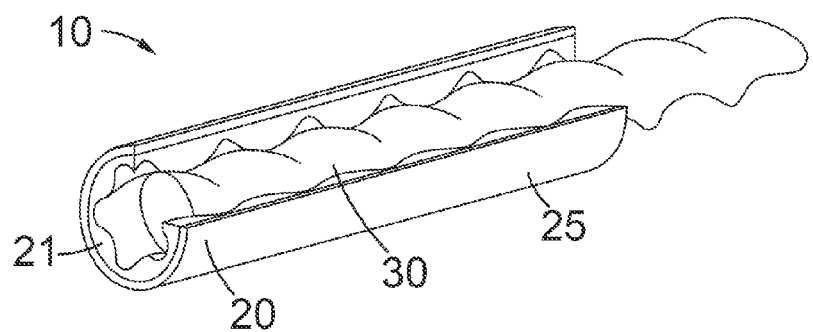
FIGS. 1A and 1B are illustrative cross sectional views of a PC pump or PD motor in accordance with an embodiment of this invention.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not in function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the terms "axial" and "axially" generally mean along or parallel to a central axis (e.g., central axis of a body or a port), while the terms "radial" and "radially" generally mean perpendicular to the central axis. The term "substantially" generally means mostly, near completely, or approximately entirely.

Exploration and production of hydrocarbons typically involves the drilling of a subsurface wellbore to reach a desired rock formation. A drill bit can be attached on the end of a drill string and rotated to bore the subsurface formation and create the wellbore. A fluid can be pumped through the drill string to the drill bit to cool and lubricate the bit and to bring cuttings to the surface up the annulus area between the drill string and the wellbore. The fluid can also provide hydraulic forces that can be converted to mechanical forces to rotate the bit. These hydraulic forces are present in the powering of PC pumps and PD motors. These PC pumps and/or PD motors can enable the drilling of directional wellbores, can be used for performance drilling to increase the power at the drill bit, can be used in operations in which the rotation of the drill string is impractical, as well as other applications.

In an embodiment, the use of high aspect ratio magnetic particles of metal, ceramics, polymer, or combinations thereof coupled with magnetic control injection process improves the strength of rubber in the stator insert. Such a method may be applied, for example, by introducing high aspect ratio magnetic particles of metal, ceramics, and polymer into NBR and forming a mixture and applying a strong magnetic field in a radial direction to orientate the particles with their major dimension in radial direction (i.e. perpendicular to the axial direction, rubber injection or extrusion direction).

In another embodiment, organic fibers are dispersed in a polymer by using substantially spherically-shaped amorphous silicon dioxide as a fiber carrier throughout the polymer matrix. In some embodiments, such a method produces a homogenous, fiber-reinforced material that meets the demands of powersection and progressive cavity pump capabilities. Comparing to what is practiced in conventional methods in rubber industry and polymer industry, one or more embodiments of the present disclosure use larger particles such as organic and inorganic fibers as reinforcing agents to increase the modulus of cured state polymers and elastomers.

In an alternate embodiment, nanotubes are dispersed in a polymer by using substantially spherically-shaped amorphous silicon dioxide as a nanotube carrier throughout the polymer matrix. In some embodiments, such a method produces a homogenous, nanotube-reinforced material that meets the demands of powersection and progressive cavity pump capabilities. This method provides for a more cost-effective solution to the clumping and nonhomogeneous distribution of the nanotubes than the modification process known in the art as surface functionalization.

Micron-size, spherical or substantially spherical, silicon dioxide particles may be used as a carrier for the fibers or nanotubes to be distributed throughout the matrix of a polymer. In an embodiment, the carrier also reduces the internal friction allowing higher filler quantities in the formulation without affecting the viscosity in an uncured state. In an embodiment, the method including fibers is suitable for a lab sized mixer such us a PrepMix BRABENDER® as well as an industrial scale internal mixer (BANBURY®) but may be adapted also to continuous mixing using a co-rotating twin-screw extruder, and optionally with an intermesh mixer design. Optionally, the method including nanotubes is suitable for a lab sized mixer such us a PrepMix BRABENDER® as well as an industrial scale internal mixer (BANBURY®), and optionally with an intermesh mixer design. The method may call for the addition of nanotubes, or fibers, and the silicon dioxide carrier to the raw polymer(s) in a BANBURY® or similar style mixer concomitant or consecutive to the carbon black, clays, silica and other type of fillers, after which point other masterbatch ingredients may be added. The total masterbatch may be allowed to mix continuously until the temperature reaches at least 100° C. for lab mixers and 125° C. for industrial size mixers. After removing from the mixer, the masterbatch may be cooled by milling and/or air cooling. The final temperature sensitive components may be added to the masterbatch during the last mixing step while controlling the critical parameters to avoid premature scorching. Once the mixing of the final batch is completed, the compound may be milled, and then processed for use with the appropriate injection, compression or transfer-moulding machinery.

In an embodiment solution mixing can be utilized wherein a solvent such as tetrahydrofuran THF, toluene, xylene or any other suitable solvent can be used to assist in the mixing of ingredients.

In an embodiment elevated pressures can be used, such as for example the use of an autoclave that can elevate pressures above atmospheric. In an embodiment the pressure ranges from 1 to 3000 psig, optionally from 1 to 2000 psig, optionally from 1 to 1000 psig, optionally from 1 to 500 psig, optionally from 1 to 250 psig, optionally from 1 to 100 psig.

In an embodiment elevated temperatures can be used, such as an elevated temperature of from 50-250° C., optionally from 100-200° C., optionally from 100-150° C.

Figure 1B:
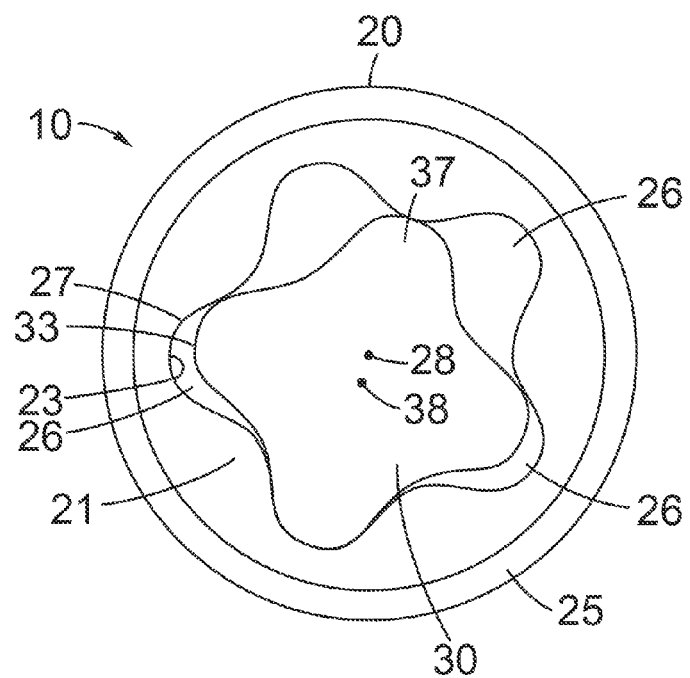

Referring to FIGS. 1A and 1B of the drawings, illustrative cross section views of a PD motor are shown. It will be understood that alternatively the machine can take the form of a PC pump. For purposes herein, the descriptions of various embodiments are intended to encompass displacement-type machines that are in the form of either a cavity screw type motor or pump.

The PD motor 10 includes a stator 20 within which a rotor 30 is rotatable. The stator 20 has a stator insert 21 bonded or otherwise attached to stator housing 25. The stator insert 21 and rotor 30 configuration creates chambers 26 in the void areas between the stator insert 21 and rotor 30. The stator insert 21 and rotor 30 are disposed within a stator housing 25. The stator housing 25 can include any tubular or pipe, such as a steel pipe.

The manner and method in which a PC pump or PD motor operates is well known in the art and need not be described herein at length. The shape of the stator insert 21 generates several pump chambers separated in the circumferential and longitudinal directions during rotation of the rotor 30 and move, in the case of a pump, in the direction towards the end with the higher pressure, and in the case of a motor, to the end with the lower pressure. The lobes 37 of the rotor 30 interact with the lobes 27 of the stator insert 21. The outer surface 33 of the rotor 30 can contact the inner surface 23 of the stator insert 21. As the rotor 30 rotates within the stator 20 the center point 38 of the rotor 30 will rotate around the center point 28 of the stator 20.

In some embodiments, the stator insert 21 is a polymer or an elastomer that is present as a film, coating, layer, or lining on the internal surface 22 of the stator housing 25 facing the rotor 30. In another embodiment, a polymeric component is incorporated throughout the interior of the stator 20 to form the stator insert 21 within the stator housing 25. The stator insert 21 may be formed in a variety of ways, including but not limited to, injection molding, transfer molding, extrusion, compression molding, or any other molding method.

The properties of some polymers that may be used for a stator insert may be altered by incorporating reinforcing agents into a polymer before the final component is formed. These reinforcing agents may have a different strength, stiffness, and resilience than the polymer. When the polymer is under stress, these reinforcing agents may form a stronger or stiffer backbone than the polymer could alone, or may provide additional resilience, elasticity, and flexibility. Furthermore, as a polymer wears, reinforcing agents embedded within the polymer are exposed to the wear surface and may slow down the wearing process of the polymer. Reinforcing agents such as carbon black, silica, and other fillers are known in the rubber industry and polymer industry to increase the modulus of cured state polymers and elastomers. However, a reinforcing agent only reinforces a region of the polymer where the reinforcing agent is in that polymer region.

The base polymer for the mixture that will be made into a stator insert may be selected from the group of elastomers including nitrile (NBR), hydrogenated nitrile (HNBR), EPDM, Chloroprene (neoprene) and fluoroelastomers (FKM), and combinations thereof. The polymer may be incorporated with reinforcing agents, which may include reinforcing fibers, nanotubes, and magnetic particles, in order to alter the properties of the stator insert. In some embodiments, incorporating reinforcing fibers, nanotubes, or magnetic particles within a stator insert as described herein affects the insert's properties including its tensile strength, modulus, resilience, resistance to stress cracks, resistance to deformation, resistance to abrasion, resistance to tear, resistance to heat buildup, heat dissipation, thermal expansion, and combinations thereof.

Figure 2A:
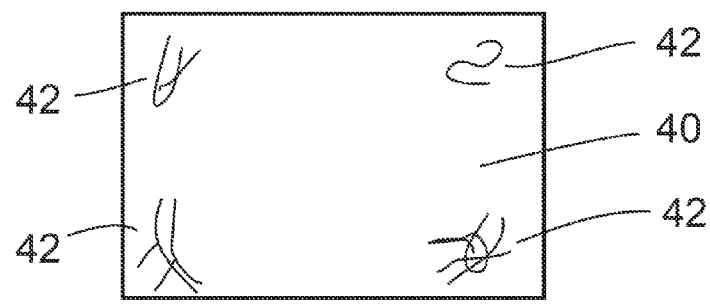
FIG. 2A is an illustration of how reinforcing fibers are dispersed in a polymer without the aid of a dispersing material in accordance with an embodiment of this invention.

Both inorganic and organic fibers, collectively reinforcing fibers, may be incorporated in a polymer as reinforcing agents. In some embodiments, inorganic fibers include nylon, rayon, ZYLON®, synthetic, other polymers, KEVLAR®, glass, ceramic, carbon, and combinations thereof. Various carbon structures can be utilized such as nanocarbons, graphene and nanotubes, such as carbon nanotubes (CNT), including single wall CNTs, multi-wall CNTs, and arrays of CNTs. In some embodiments, organic fibers include natural fibers such as cotton, wool, animal hair, silk, bamboo, and combinations thereof. As with other reinforcing agents, reinforcing fibers only reinforce a polymer where the reinforcing agent is present in the polymer. When incorporated alone, reinforcing fibers may clump or bundle together, resulting in a nonhomogenous distribution throughout a polymer as illustrated in FIG. 2A. This may provide nonhomogenous properties throughout the polymer. The polymer 40 has reinforcing fibers 42 dispersed within it.

Figure 2B:
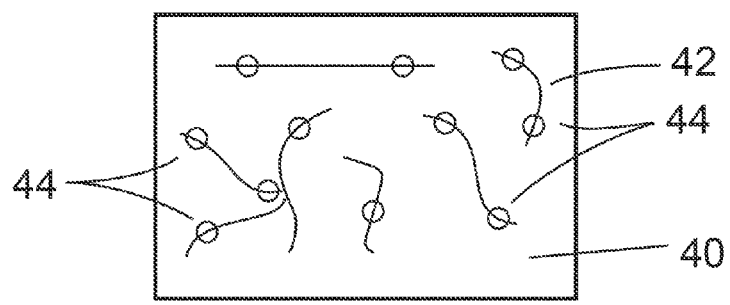
FIG. 2B is an illustration of how nanotubes are dispersed in a polymer without the aid of a dispersing material in accordance with an embodiment of this invention.

In an alternate embodiment, nanotubes are incorporated in a polymer as reinforcing agents. The nanotubes can include carbon nanotubes (CNT) including single wall CNTs, multi-wall CNTs, arrays of CNTs, and the like. As with other reinforcing agents, nanotubes only reinforce a polymer where the nanotube is present in the polymer. A carbon nanotube has a great affinity for other carbon nanotubes, and accordingly, when incorporated alone, carbon nanotubes may clump or bundle together, resulting in a nonhomogenous distribution throughout a polymer as illustrated in FIG. 2B. This may provide nonhomogenous properties throughout the polymer. The polymer 40 has nanotubes 43 dispersed within it. As mentioned above, a method known in the art for dispersing carbon nanotubes throughout a polymer in a homogeneous distribution includes the utilization of surface functionalization. However, surface functionalization generally adds significant costs to the manufacture process of the stator insert and may be cost prohibitive.

Nanotubes can be formed from a variety of materials, for example, carbon or silicon. Carbon nanotubes exhibit desirable combinations of mechanical, thermal and electrical properties for applications defined by embodiments described herein. Carbon nanotubes are generally in the range from approximately 0.5 nanometers to approximately 100 nanometers, at the least dimension.

The polymer and the nanotubes may interact via interfacial interactions, such as co-polymerization, crystallization, van der Waals interactions, covalent bonds, ionic bonds, and cross-linking interactions. The inclusion of nanotubes in the polymer improves the particle reinforced polymer matrix by reducing processing viscosity, improving impact strength, improving stress relaxation resistance, improving compression set properties, increasing tear strength, increasing resistance to thermal and hysteresis, reducing heat buildup failure, increasing thermal conductivity, reducing creep, improving resilience and abrasion resistance, and improving resistance to chemical degradation of the polymer. Additionally, nanotube reinforced polymers generally require lesser amounts of filler material than traditional fillers to achieve comparable physical properties. The lesser amount of nanotubes required to reinforce a cured polymer has a concomitant effect of lowering the uncured viscosity of the polymer and thereby improving the ability to manufacture longer and thinner profiles of polymer stator elements and improving physical properties at elevated temperatures.

An embodiment of the present invention uses a dispersing substance with the reinforcing fibers to obtain an improved reinforcing fiber distribution throughout the polymer, resulting in an improved reinforcing fiber distribution throughout the stator insert. Optionally, a dispersing substance is utilized with the nanotubes to obtain an improved nanotube distribution throughout the polymer, resulting in an improved nanotube distribution throughout the stator insert. In an embodiment, the dispersing substance acts as a carrier of the reinforcing fibers. In an alternate embodiment, the dispersing substance acts as a carrier of the nanotubes. In some embodiments, the dispersing substance may reduce the internal friction within the polymer. Reduced internal friction within the polymer may permit higher quantities of nanotubes, reinforcing agents or fillers to be incorporated without negatively affecting the polymer's viscosity in an uncured state to an undesirable degree. Improved high shear viscosities enables the polymer to be molded more easily by injection molding, transfer molding, compression molding, or another molding process. The addition of one or more dispersing substance(s) can affect the viscosity at high shear flows. The dispersing substance can include silicon dioxide, clay, glass, fumed silica, diamond, and combinations thereof. In some embodiments, the silicon dioxide is micron-size. Optionally, the dispersing substance has an average particle size of from 25 to 300 nm, alternatively from 50 to 250 nm, or alternatively from 100 to 200 nm. In an embodiment, the dispersing agent has a specific surface area of from 5 to 50 m$^2$/g, alternatively from 10 to 40 m$^2$/g, or alternatively from 15 to 25 m$^2$/g. Optionally, the dispersing substance is nonreactive and/or spherical. In an exemplary embodiment, the dispersing substance is silicon dioxide. In some embodiments, the silicon dioxide is spherical. In some embodiments, the silicon dioxide is micron-size and spherical. In some embodiments, other reinforcing agents that are incorporated in the polymer include carbon black, clays, silica, other types of fillers, and combinations thereof.

Figure 2C:
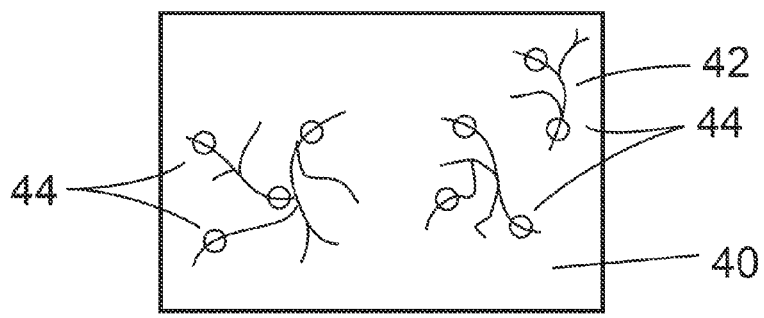
FIG. 2C is an illustration of the dispersion of reinforcing fibers in the presence of a dispersing material acting as a carrier within a polymer in accordance with an embodiment of this invention.

FIG. 2C illustrates a manner by which a dispersing substance 44 acts as a carrier for the reinforcing fibers 42 within the polymer 40. The dispersing substance 44 may bond or otherwise attach to the reinforcing fibers 42. The dispersing substance 44 decreases the internal friction within the polymer 40, permitting a more free flow of the dispersing substance 44 and reinforcing fibers 42. The dispersing substance 44 also decreases the affinity of the reinforcing fibers 42 to each other, which could otherwise cause clumping. The dispersing substance 44 permits the reinforcing fibers 42 to attain a more homogenous distribution than would otherwise be possible.

Figure 2D:
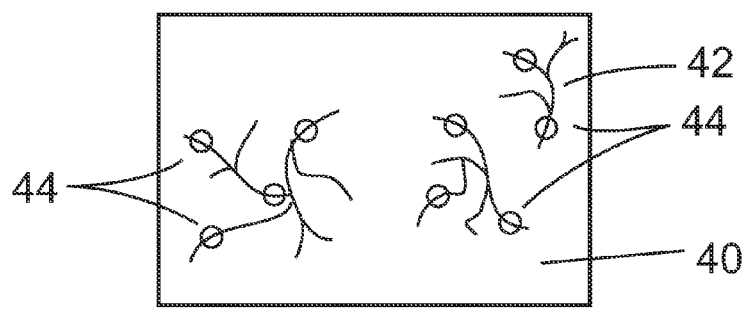
FIG. 2D is an illustration of the dispersion of reinforcing fiber pulp in the presence of a dispersing material acting as a carrier within a polymer in accordance with an embodiment of this invention.

FIG. 2D illustrates a manner by which a dispersing substance 44 acts as a carrier for reinforcing fiber pulp 42 within the polymer 40. The dispersing substance 44 may bond or otherwise attach to the reinforcing fiber pulp 42. The dispersing substance 44 decreases the internal friction within the polymer 40, permitting a more free flow of the dispersing substance 44 and reinforcing fiber pulp 42. The dispersing substance 44 also decreases the affinity of the reinforcing fiber pulp 42 to each other, which could otherwise cause clumping. The dispersing substance 44 permits the reinforcing fiber pulp 42 to attain a more homogenous distribution than would otherwise be possible.

Figure 2E:
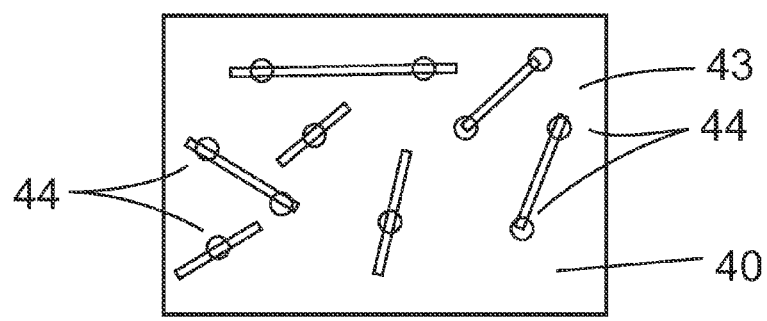
FIG. 2E is an illustration of the dispersion of nanotubes in the presence of a dispersing material acting as a carrier within a polymer in accordance with an embodiment of this invention.

FIG. 2E illustrates a manner by which a dispersing substance 44 acts as a carrier for the nanotubes 43 within the polymer 40. The dispersing substance 44 may bond or otherwise attach to the nanotubes 43. The dispersing substance 44 decreases the internal friction within the polymer 40, permitting a more free flow of the dispersing substance 44 and nanotubes 43. The dispersing substance 44 also decreases the affinity of the nanotubes 43 to each other, which could otherwise cause clumping. The dispersing substance 44 permits the nanotubes 43 to attain a more homogenous distribution than would otherwise be possible. Additionally, the utilization of the dispersing substance provides a more cost-effective solution to the clumping and nonhomogeneous distribution of the nanotubes than the modification process known in the art as surface functionalization.

In an embodiment, the reinforcing fibers and dispersing agent increase the tensile strength by 1500-5000 psi or by 20-500%. In an embodiment, the reinforcing fibers and dispersing substance increase the modulus by 300-3000 psi or by 20-1500%. In another embodiment, the reinforcing fibers and dispersing substance increase the hardness from less than 80 shore A to greater than 90 shore A, for example from 75 shore A to 98 shore A. These properties are measured according to ASTM D-412. In an embodiment, the reinforcing fibers and dispersing substance increase the tear resistance by 100-500 lb/linear inch as determined by ASTM D-624 Tear Die C.

An embodiment of the present invention uses a dispersing substance with the reinforcing fibers to obtain an improved reinforcing fiber distribution throughout the polymer, resulting in an improved reinforcing fiber distribution throughout the stator insert. The reinforcing fiber may be KEVLAR® and the dispersing substance may be silicon dioxide. In an embodiment wherein the reinforcing fiber is KEVLAR® and the dispersing substance is silicon dioxide, the ratio of KEVLAR®:silicon dioxide ranges from 10:90 wt % to 70:30 wt %. Alternately the ratio of KEVLAR®:silicon dioxide can range from 15:85 wt % to 60:40 wt %, optionally from 30:70 wt % to 50:50 wt %, optionally from 35:65 wt % to 45:55 wt %.

Another embodiment of the present invention uses a dispersing substance with nanotubes to obtain an improved nanotube distribution throughout the polymer, resulting in an improved nanotube distribution throughout the stator insert. The nanotubes may be carbon nanotubes and the dispersing substance may be silicon dioxide. In an embodiment wherein the nanotubes are carbon nanotubes and the dispersing substance is silicon dioxide, the ratio of carbon nanotubes:silicon dioxide ranges from 1:99 wt % to 50:50 wt %, optionally from 1:99 wt % to 25:75 wt %, optionally from 1:99 wt % to 10:90 wt %, optionally from 2:98 wt % to 8:92 wt %.

Other reinforcing agents to be used in a polymer for a stator insert may include magnetic particles made of metal, ceramic, or polymer. In some embodiments, the magnetic particles have a high aspect ratio, thus one dimension is larger than the others such that the particle substantially lies along an axis. The magnetic particles may be magnets or susceptible to magnetic fields, including paramagnetic or ferromagnetic materials. The reinforcing agents may be incorporated in a polymer prior to forming a stator insert. In some embodiments, the stator insert is formed by an injection molding, transfer molding, or compression molding process. When the polymer is inserted into the mold by any of the above methods, the magnetic particles are dispersed throughout the polymer. In some embodiments, the dispersion is substantially uniform throughout the stator insert. In other embodiments, the dispersion is not uniform, but concentrated in at least one area of the stator insert.

Figure 3A:
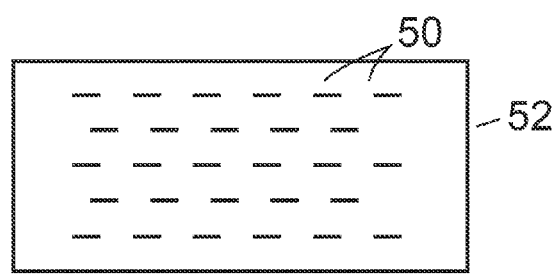
FIG. 3A illustrates a homogenous distribution of magnetic particles throughout a stator insert in accordance with an embodiment of this invention.
Figure 3B:
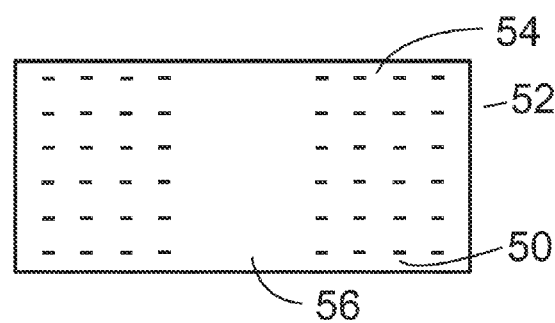
FIG. 3B illustrates a homogenous distribution of magnetic particles in at least one region of a stator insert in accordance with an embodiment of this invention.
Figure 3C:
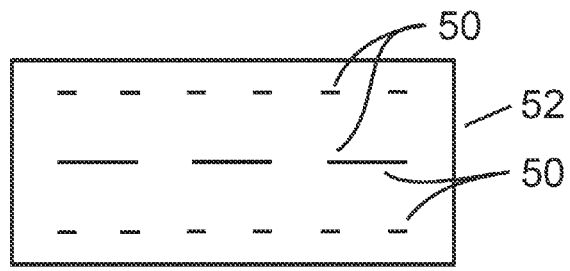
FIG. 3C illustrates a patterned distribution of magnetic particles throughout a stator insert in accordance with an embodiment of this invention.
Figure 3D:
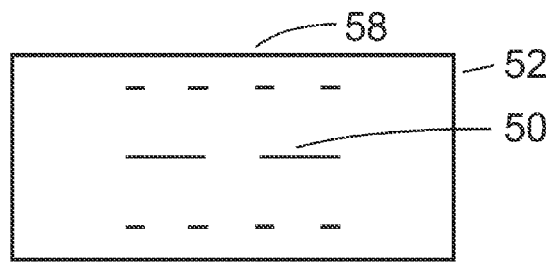
FIG. 3D illustrates a patterned distribution of magnetic particles in a region of a stator insert in accordance with an embodiment of this invention.
Figure 3E:
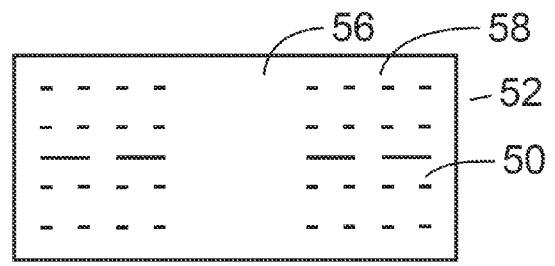
FIG. 3E illustrates a region of a stator insert substantially devoid of all magnetic particles in accordance with an embodiment of this invention.

In an embodiment, before the stator insert has fully set in the mold, a magnetic field is applied to the stator insert. The magnetic field may move the magnetic particles within the unset stator insert and/or orient them in a particular direction. The magnetic field may move the magnetic particles within the unset stator insert to obtain a particular distribution of the particles throughout the stator insert upon setting. Such particular distributions may include as illustrated in FIG. 3 a homogenous distribution of magnetic particles 50 throughout the stator insert 52 (FIG. 3A); or at least one region 54 of the stator insert 52 having a homogenous distribution of magnetic particles 50 and another region 56 substantially devoid of all magnetic particles (FIG. 3B); a patterned distribution of magnetic particles 50 throughout the stator insert 52 (FIG. 3C); or at least one region 58 of the stator insert 52 having a patterned distribution (FIG. 3D); or a region 56 of a stator insert 52 substantially devoid of all magnetic particles 50 (FIG. 3E).

The magnetic field may be applied by passing the stator insert through a magnet generating a magnetic field, or by passing a magnet generating a magnetic field through the stator insert. The magnetic field may have strength in the range of about 10-1000 A/m and a density is in the range of about 1-10,000 Tesla. In an embodiment the magnetic field may have strength in the range of about 10-750 A/m, optionally from 10-500 A/m, optionally from 10-250 A/m, optionally from 10-100 A/m. In an embodiment the magnetic field may have strength in the range of about 100-1000 A/m, optionally from 250-1000 A/m, optionally from 500-1000 A/m, optionally from 750-1000 A/m. In an embodiment the magnetic field may have strength in the range of about 100-900 A/m, optionally from 250-750 A/m, optionally from 400-600 A/m.

In an embodiment the magnetic field density is in the range of about 1-7,500 Tesla, optionally from 1-5000 Tesla, optionally from 1-2500 Tesla, optionally from 1-1000 Tesla. In an embodiment the magnetic field density is in the range of about 250-10,000 Tesla, optionally from 500-10,000 Tesla, optionally from 1000-10,000 Tesla, optionally from 2500-10,000 Tesla, optionally from 5000-10,000 Tesla, optionally from 7500-10,000 Tesla. In an embodiment the magnetic field density is in the range of about 100-10,000 Tesla, optionally from 250-8000 Tesla, optionally from 500-7500 Tesla, optionally from 1000-5000 Tesla, optionally from 2500-5000 Tesla.

Figure 4A:
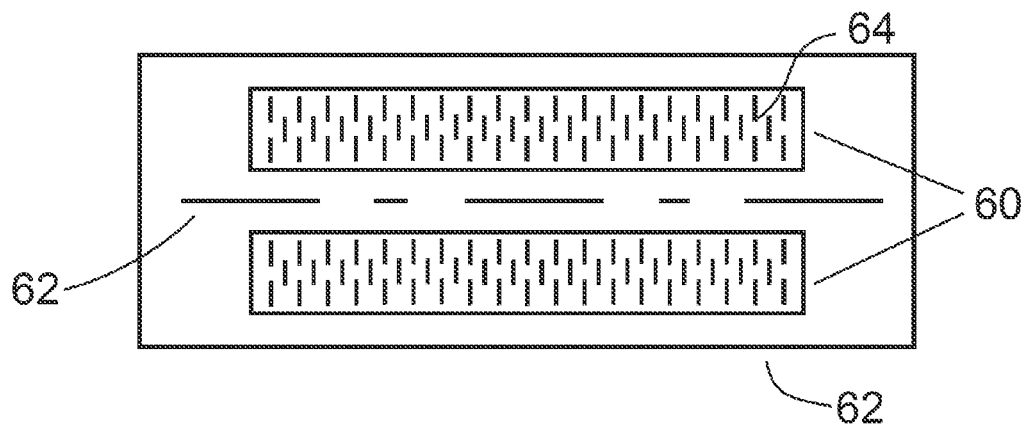
FIG. 4A illustrates a cross section of a hollow stator insert with magnetic particles oriented in a radial direction throughout the stator insert in accordance with an embodiment of this invention.
Figure 4B:
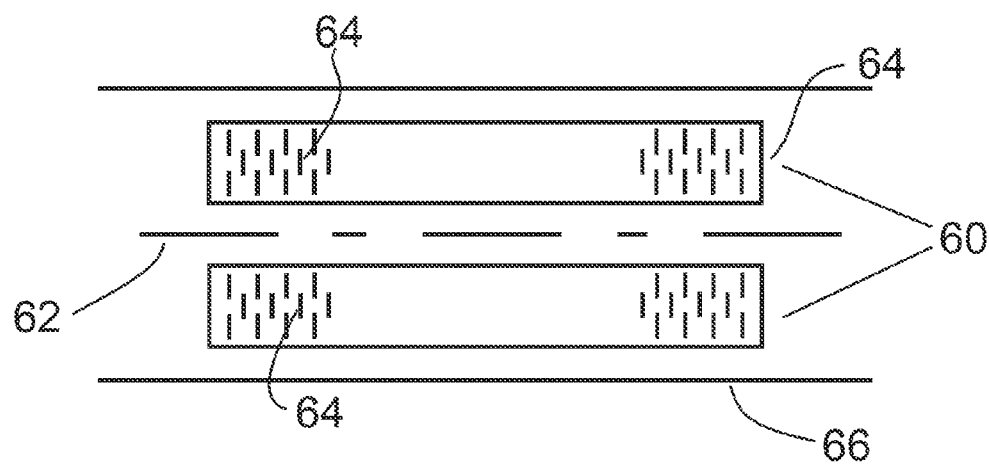
FIG. 4B illustrates a cross section of a hollow stator insert with magnetic particles oriented in a radial direction in regions of the stator insert in accordance with an embodiment of this invention.

In an embodiment as illustrated in FIG. 4A, the stator insert 60 is hollow and lies substantially along an axis 62 of the stator housing 66. In this embodiment, a magnetic field passing through the stator insert 60 orients the magnetic particles 64 in a radial direction such that the magnetic particles 64 are perpendicular to the axis 62. In another embodiment, the magnetic field orients the magnetic particles in an axial direction such that the magnetic particles are parallel to the axial direction of the stator insert. In still another embodiment as illustrated in FIG. 4B, the magnetic field moves the magnetic particles 64 within the stator insert 60 to obtain a particular distribution of the magnetic particles 64 and also orients the magnetic particles 64 in a particular direction.

Figure 4C:
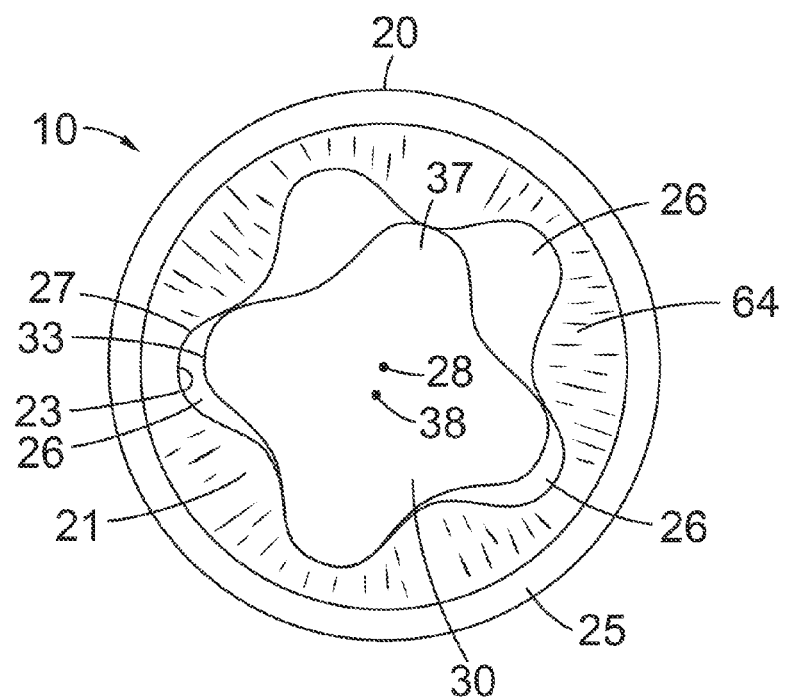
FIG. 4C illustrates an embodiment of the PC pump or PD of FIG. 1B having magnetic particles oriented in a radial direction in regions of the stator insert in accordance with an embodiment of this invention.

FIG. 4C illustrates an embodiment of the PC pump or PD of FIG. 1B having magnetic particles 64 oriented in a radial direction in regions of the stator insert 21.

In another embodiment, the polymer mixture containing the magnetic particles enters a stator insert mold by injection, compression, or extrusion along a certain flow direction with the magnetic particles substantially parallel to the flow direction. Application of a magnetic field to the polymer mixture orients at least some of the magnetic particles in a different direction. In an embodiment, the magnetic field orients at least some of the magnetic particles to be substantially perpendicular to the flow direction. In another embodiment where the polymer mixture is to form a stator insert with an axial direction, the magnetic field orients at least some of the magnetic particles to be oriented in a radial direction such that the magnetic particles are perpendicular to the axial direction.

In another embodiment, the magnetic field is applied to the stator insert after the stator insert has set. The magnetic field may be applied by passing the stator insert through a magnet generating a magnetic field or by passing a magnet generating a magnetic field through the stator insert. The magnetic field may move magnetic particles within the stator insert and/or change the orientation of the magnetic particles within the stator insert.

The magnetic particles may be incorporated in the polymer and stator insert with other reinforcing agents. Furthermore, some reinforcing agents may be combined with magnetic particles so that orienting the magnetic particles in a particular manner may orient the reinforcing agents in a particular manner. Such reinforcing agents may include, but are not limited to, the following: inorganic fibers, organic fibers, clays, silica, carbon black, silicon dioxide, and diamond particles, ranging in size from about 100 to about 400 nm; nanotubes ranging in size from about 0.5 nm to about 100 nm; and combinations thereof. Inorganic fibers include at least nylon fibers, rayon fibers, KEVLAR® fibers, glass fibers, ceramic fibers, ZYLON® fibers, synthetic fibers, and carbon fibers. Organic fibers include at least cotton fibers, wool fibers and animal hair, silk, and bamboo fibers. Various carbon structures can be utilized such as nanocarbons, graphene and nanotubes. Nanotubes include at least carbon nanotubes (CNT) including single wall CNTs, multi-wall CNTs, and arrays of CNTs. The magnetic particles may be bonded, woven into, embedded in, or otherwise attached to other reinforcing agents to orient and/or move the other reinforcing agents within the stator insert when a magnetic field is applied. In an embodiment, the magnetic particles increase the tensile strength by 1500-5000 psi or by 20-500%. In an embodiment, the magnetic particles increase the modulus by 300-3000 psi or by 20-1500%. In another embodiment, the magnetic particles increase the hardness from 75 shore A to 98 shore A. In an embodiment, the reinforcing fibers and dispersing agent increase the tear resistance by 100-500 lb/linear inch.

Certain orientations or distributions of the magnetic particles may be desirable for a number of reasons. For example, a homogenous distribution throughout the stator insert may uniformly change the properties of the stator insert. A non-homogenous distribution may be desirable for the creation of a known or predictable failure point of a stator insert or to strengthen a particular region of a stator insert. An orientation perpendicular to a flow direction or the axis of rotation may increase the wear resistance and strength of the stator insert in some embodiments. In other embodiments, an orientation parallel to the flow direction or the axis of rotation may increase the strength of the stator insert.

Nanotubes, or reinforcing fibers, and micron-size, spherical, silicon dioxide (collectively referred to as "the additives") may be added to a raw polymer such as nitrile butadiene rubber in a BANBURY® industrial scale mixer, PrepMix BRABENDER®, intermesh mixer, twin screw extruder, conventional mill, or similar style mixer. In an embodiment, wherein the additives include KEVLAR® and silicon dioxide, the additives are incorporated into the raw polymer in a concentration of 15 parts per hundred (pph). Optionally, the additives are incorporated into the raw polymer in a concentration of 3 parts per hundred (pph). Optionally, the additives are incorporated into the raw polymer in a concentration of 20 parts per hundred (pph). In an embodiment, wherein the additives include carbon nanotubes and silicon dioxide, the additives are incorporated into the raw polymer in a concentration of 7 parts per hundred (pph). Optionally, the additives are incorporated into the raw polymer in a concentration of 0.5 parts per hundred (pph). Optionally, the additives are incorporated into the raw polymer in a concentration of 10 parts per hundred (pph). Carbon black, clays, silica, and other types of fillers may also be incorporated in the raw polymer. Afterwards, other masterbatch ingredients may be added and mixed until the temperature of the mixture reaches at least 100° C. for PrepMix lab mixers and 125° C. for industrial size mixers. Temperature sensitive components may be incorporated into the masterbatch near the end of the mixing stage while controlling critical parameters to avoid premature scorching. Then the mixture can be removed and cooled, such as by air cooling, followed by milling and processing for use with the appropriate molding machinery.

In an alternate embodiment, the reinforcing fibers and/or dispersing substance and/or magnetic particles are incorporated in the polymer and stator insert by solution mixing methods rather than physical blending. In another alternate embodiment, the reinforcing fibers and/or dispersing substance and/or magnetic particles are incorporated in the polymer and stator insert by solution mixing methods in addition to physical blending. The following examples of processing conditions and parameters are given for the purpose of illustrating certain exemplary embodiments of the present invention.

EXAMPLE

KEVLAR® fibers were added to a sample of nitrile (NBR) elastomer in an amount of 2-10 parts per one hundred rubber (phr) along with a dispersing substance (silicon dioxide, $SiO_2$) in an amount of 4-15 phr. The sample was tested and had a resulting increase of about 75% to the tear resistance and an increase of about 100% to the modulus without affecting the uncured polymer viscosity in a negative way. Data from this testing is shown in Table 1.

Figure 5A:
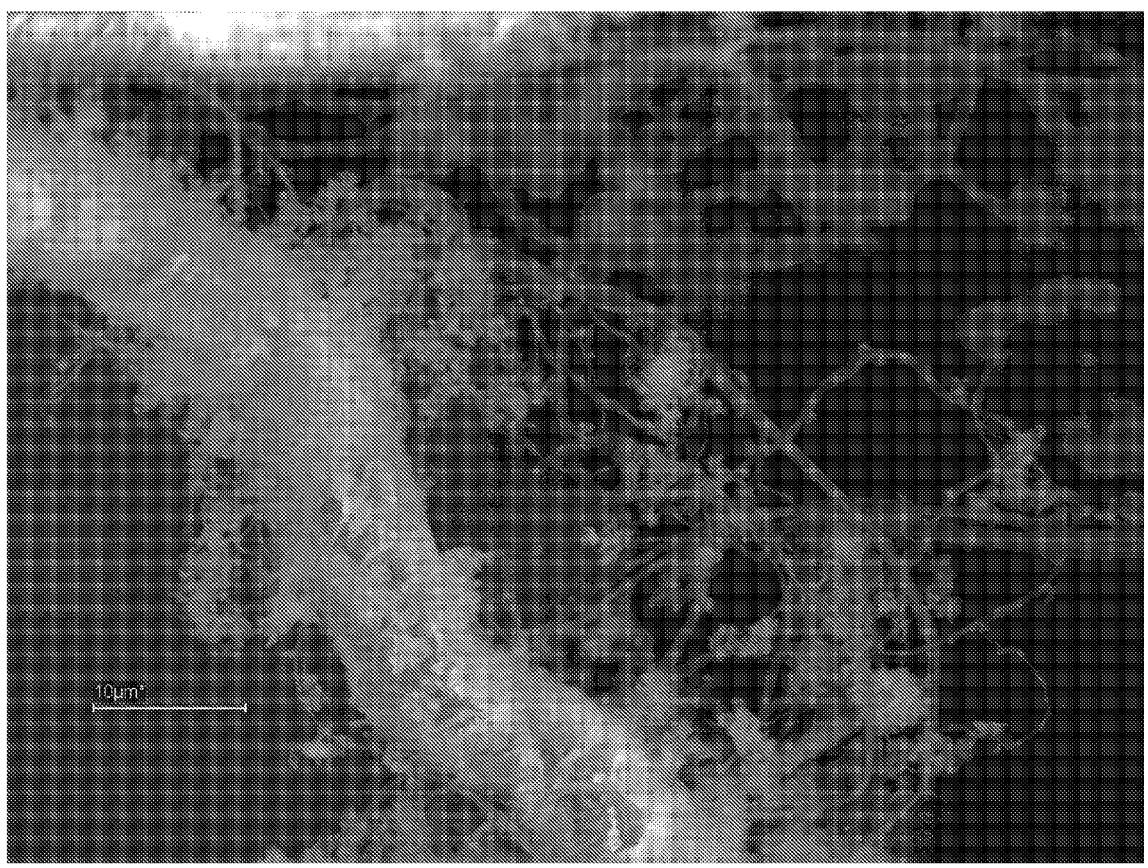
FIGS. 5A, 5B and 5C are Scanning Electron Microscope (SEM) Images of KEVLAR® fiber reinforced elastomers and $SiO_2$ within an elastomer matrix.
Figure 5B:
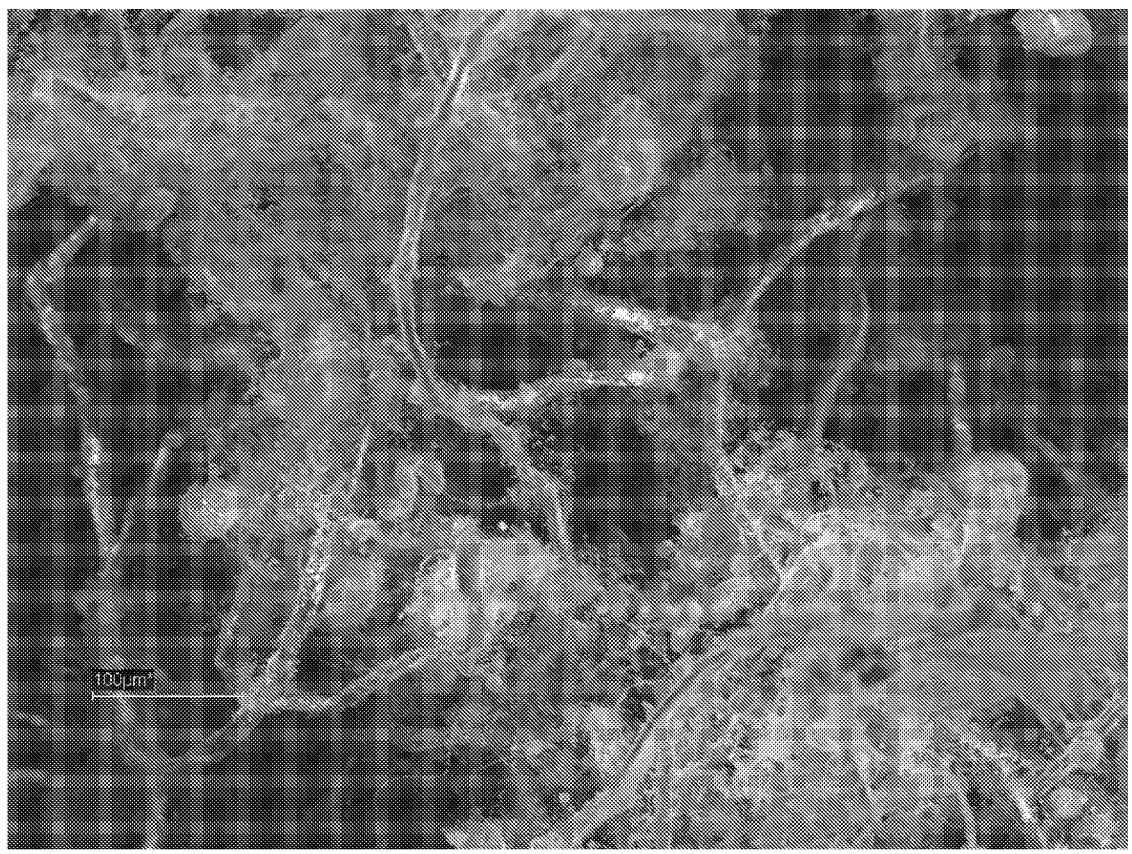
Figure 5C:
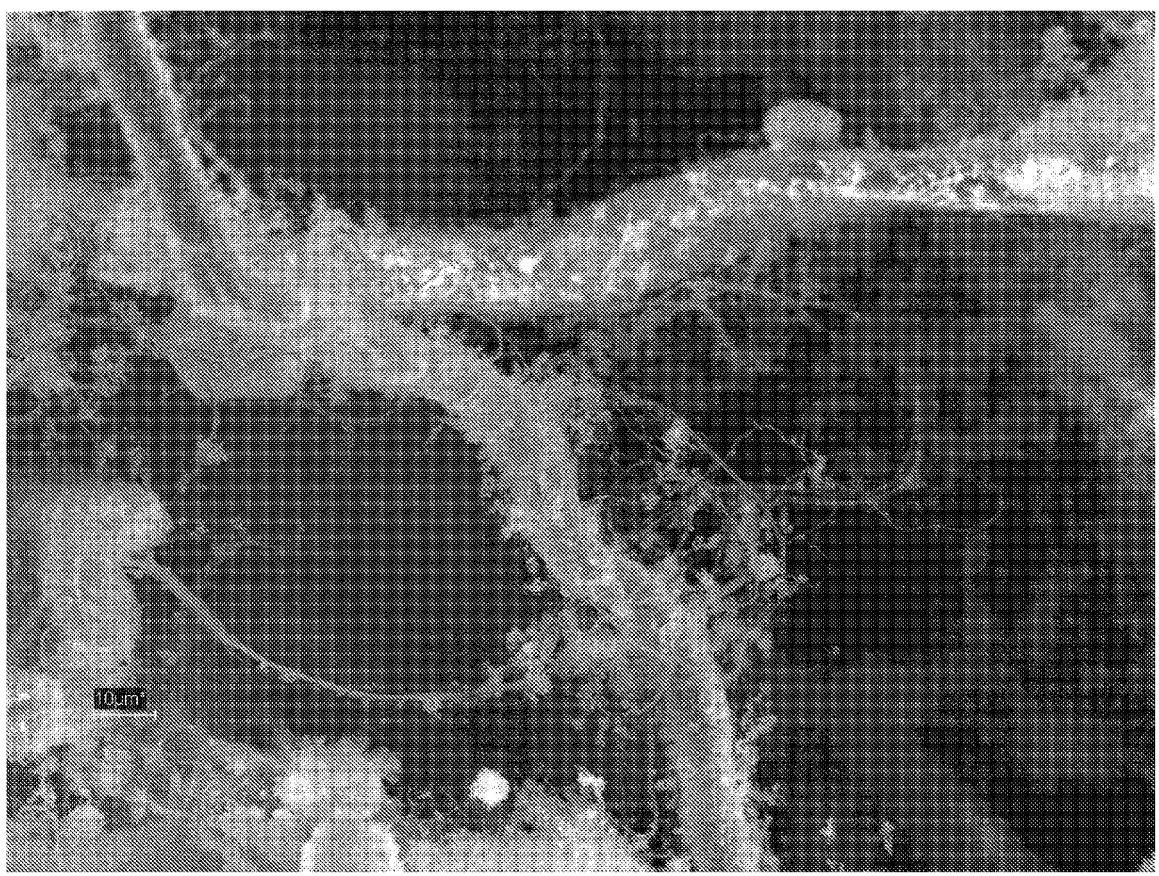

FIGS. 5A and 5B show Scanning Electron Microscope (SEM) Images of KEVLAR® fiber reinforced elastomers and the $SiO_2$ within the elastomer matrix.

TABLE 1

|  | Control | 11.5 parts of fiber/$SiO_2$ mixture |
|---|---|---|
| Modulus 25% (psi) | 222 | 580 |
| Modulus 50% (psi) | 304 | 809 |
| Modulus 100% (psi) | 516 | 1065 |
| Modulus 200% (psi) | 1077 | 1504 |

While embodiments have been shown and described, modifications thereof can be made by one skilled in the art without departing from the scope or teachings herein. The embodiments describe herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims.

What is claimed is:

1. A stator insert comprising:
   an elastomeric component;
   a reinforcing agent; and
   a dispersing substance; wherein said dispersing substance has a specific surface area of 5 $m^2/g$ to 50 $m^2/g$, and wherein the dispersing substance is a carrier for the reinforcing agent within the elastomeric component; and the reinforcing agent and dispersing substance are substantially homogenously distributed throughout the elastomeric component.

2. The stator insert of claim 1, wherein the reinforcing agent is one or more organic fibers.

3. The stator insert of claim 1, wherein the reinforcing agent is one or more inorganic fibers.

4. The stator insert of claim 1, wherein the reinforcing agent is one or more carbon nanotubes.

5. The stator insert of claim 1, wherein the dispersing substance is selected from the group consisting of clay, glass, fumed silica, silicon dioxide, diamond, and combinations thereof.

6. The stator insert of claim 1, wherein the dispersing substance is silicon dioxide.

7. The stator insert of claim 1, further comprising:
   a plurality of magnetic particles; wherein the magnetic particles are disposed within the elastomeric component.

8. The stator insert of claim 7, wherein the stator insert substantially lies along a central axis and the plurality of magnetic particles are substantially oriented perpendicular to the axis.

9. A method of making a stator insert, comprising:
   incorporating a reinforcing agent and a dispersing substance into a polymer to form a substantially homogenous mixture wherein said dispersing substance has a specific surface area of 5 $m^2/g$ to 50 $m^2/g$; and
   forming a stator insert from the mixture.

10. The method of claim 9, wherein the polymer contains at least one of carbon black, clay, or silica.

11. The method of claim 9, wherein the dispersing substance is selected from the group consisting of clay, glass, fumed silica, diamond, silicon dioxide and combinations thereof.

12. The stator insert of claim 9, wherein the dispersing substance is silicon dioxide.

13. The method of claim 12, wherein the silicon dioxide is micron-size and substantially spherical.

14. The method of claim 9, wherein the polymer is selected from the group consisting of nitrile (NBR), hydrogenated nitrile (HNBR), EPDM, Chloroprene (neoprene) and fluoroelastomers (FKM), and combinations thereof.

15. The method of claim 9, wherein the reinforcing agent is one or more organic fibers.

16. The method of claim 9, wherein the reinforcing agent is one or more inorganic fibers.

17. The method of claim 9, wherein the reinforcing agent is one or more carbon nanotubes.

18. The method of claim 9, further comprising:
incorporating a plurality of magnetic particles into the substantially homogenous mixture; and
applying a magnetic field to the stator insert to orient the plurality of magnetic particles.

19. A method of making a stator insert, comprising:
incorporating a plurality of magnetic particles into a polymer, resulting in a mixture;
forming a stator insert from the mixture wherein the plurality of magnetic particles have high aspect ratios; and
applying a magnetic field to the stator insert, wherein the stator insert lies along a central axis and wherein said applying the magnetic field to the stator insert orients the plurality of high aspect ratio magnetic particles to be perpendicular to the central axis.

20. The method of claim 19, wherein the polymer is selected from the group consisting of nitrile (NBR), hydrogenated nitrile (HNBR), EPDM, Chloroprene (neoprene) and fluoroelastomers (FKM), and combinations thereof.

21. The method of claim 19, wherein the stator insert comprises diamond particles.

22. The method of claim 19, wherein the stator insert comprises KEVLAR® fibers.

23. The method of claim 19, further comprising:
incorporating a reinforcing agent and a dispersing substance into the mixture.

24. The method of claim 19, further comprising incorporating a dispersing substance into the mixture wherein the dispersing substance has a specific surface area of 5 $m^2/g$ to 50 $m^2/g$.

25. A stator insert comprising:
an elastomeric component;
a reinforcing agent; and
silicon dioxide; wherein said silicon dioxide has a specific surface area of 5 $m^2/g$ to 50 $m^2/g$, wherein a ratio of said reinforcing agent to said silicon dioxide is from 10:90 wt % to 70:30 wt %, and wherein the reinforcing agent and silicon dioxide are homogenously distributed throughout the elastomeric component.

26. The stator insert of claim 25, wherein a tensile strength of said stator insert is 20 to 500% greater than a stator that has a nonhomogenous distribution of reinforcing agent and silicon dioxide.

* * * * *